(12) United States Patent
Wang et al.

(10) Patent No.: US 8,462,899 B2
(45) Date of Patent: Jun. 11, 2013

(54) MULTI-USER DETECTING METHOD AND DEVICE OF OFDM TRANSMISSION SIGNAL

(75) Inventors: Yingmin Wang, Beijing (CN); Shaohui Sun, Beijing (CN); Hai Bi, Beijing (CN); Shiqiang Suo, Beijing (CN); Yeming Tang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 394 days.

(21) Appl. No.: 12/680,362

(22) PCT Filed: Sep. 25, 2008

(86) PCT No.: PCT/CN2008/001657
§ 371 (c)(1),
(2), (4) Date: Jul. 14, 2010

(87) PCT Pub. No.: WO2009/049482
PCT Pub. Date: Apr. 23, 2009

(65) Prior Publication Data
US 2010/0303162 A1    Dec. 2, 2010

(30) Foreign Application Priority Data

Sep. 27, 2007    (CN) .......................... 2007 1 0175240

(51) Int. Cl.
*H03D 1/04* (2006.01)
(52) U.S. Cl.
USPC ........... 375/346; 375/144; 375/148; 375/239; 375/260; 375/267; 375/330; 375/335; 375/340; 375/347; 375/348; 375/349; 375/350

(58) Field of Classification Search
USPC ................ 375/260, 267, 316, 340, 349, 144, 375/148, 239, 330, 335, 346, 347, 348, 350
See application file for complete search history.

(56) References Cited

U.S. PATENT DOCUMENTS

| | | | |
|---|---|---|---|
| 7,463,694 B2* | 12/2008 | Kwak et al. .................. | 375/267 |
| 8,000,268 B2* | 8/2011 | Fukuta et al. ................. | 370/260 |
| 2007/0109956 A1* | 5/2007 | Kwon et al. .................. | 370/208 |
| 2007/0211672 A1* | 9/2007 | Song et al. ................... | 370/335 |

FOREIGN PATENT DOCUMENTS

| | | |
|---|---|---|
| CN | 1595924 A | 3/2005 |
| CN | 1658605 A | 8/2005 |
| EP | 1 821 435 A1 | 8/2007 |
| WO | 2006/132589 A2 | 12/2006 |

OTHER PUBLICATIONS

International Search Report: PCT/CN2008/001657.

* cited by examiner

*Primary Examiner* — Sophia Vlahos
(74) *Attorney, Agent, or Firm* — Ladas & Parry LLP

(57) ABSTRACT

A method and device for multi-user detecting of an OFDM transmission signal are provided. The method includes: combining received signals, at corresponding time-frequency symbol positions in all of multiple repeated Block Units in relation to the same data symbol, into a received data sequence; determining a combined repeated channel response sequence array corresponding to the received data sequence; and detecting the received data sequence using the combined repeated channel response sequence array to obtain data symbols of multiple users. The technical solution can effectively restrain the multi-address interference and the interference between symbols during OFDM transmitting signal and improve the system performance greatly.

18 Claims, 9 Drawing Sheets ically to the technology of multi-user joint detection of a Block Repeat Orthogonal Frequency Division Multiplexing (OFDM) transmission signal in a broadband wireless mobile communication system.

MULTI-USER DETECTING METHOD AND DEVICE OF OFDM TRANSMISSION SIGNAL

The present application claims the benefit of priority to International Patent Application No. PCT/CN2008/001657 filed Sep. 25, 2008, which further claims the benefit of priority to Chinese patent Application No. 200710175240.5 filed Sep. 27, 2007, the contents of which are incorporated herein by reference in their entirety.

FIELD OF THE INVENTION

The present invention relates to the field of signal detection technologies, and in particular to the technology of multi-user joint detection of a Block Repeat Orthogonal Frequency Division Multiplexing (OFDM) transmission signal in a broadband wireless mobile communication system.

BACKGROUND OF THE INVENTION

Broadband wireless communications enable a user to enjoy numerous wireless mobile services such as those of high-speed data downloading, online shopping, mobile video chatting and mobile TV, and therefore represent the dominating development tendency in the future mobile communications. If the future broadband wireless communication system always employs the traditional single-carrier transmission approach, InterSymbol Interference (ISI) of a broadband wireless communication signal would increase significantly.

To eliminate the inter-symbol interference of a broadband wireless communication signal, an OFDM technology is proposed to improve the performance of demodulated signals and adopted and standardized in both the Long Term Evolution (LTE) project of the 3GPP and the 802.16 architecture of the IEEE. The OFDM is also known as a fundamental technology in the future broadband wireless mobile communication system. In the case of the OFDM modulation approach, physical resources are divided based on the number of sub-carriers in the frequency domain and the number of OFDM symbols in the time domain, a basic Physical Resource Block (PRB) includes a predefined combination of several sub-carriers and several OFDM symbols, and each user or channel is allocated with one or more basic Physical Resource Block for the communication and transmission of a wireless signal, as shown in FIG. 1, in which 9 PRBs are allocated to 6 users, with each PRB being a basic unit of mapping transmission data into the physical layer.

The structure of each of the PRBs may be illustrated with a 2-dimension structure in the time and frequency domains as shown in FIG. 2, thus the PRB is also referred to as time and frequency resource block unit. As shown, the time and frequency resource block unit includes $N_T$ OFDM symbols in the time domain and $N_F$ OFDM sub-carriers in the frequency domain, with the total number of symbols in the time and frequency resource block unit being $N=N_T \times N_F$. The symbols in the time and frequency resource block unit are represented as follows:

$$s_{N_T \times N_F} = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}$$

All of the symbols in the time and frequency resource block unit can be data symbols. Alternatively, a part of the symbols in the time and frequency resource block unit can be pilot symbols designed for channel estimation of signals received at the receiving side. FIG. 3 is a schematic diagram showing the positions of the pilot symbols and data symbols in the time and frequency resource block unit.

In this case, time and frequency resource block units from multiple users can be transmitted through orthogonal OFDM sub-carriers, with each user occupying a different sub-carrier, so that the division multiplex and multiple access of multiple users is implemented. When the OFDM system is applied to a cellular mobile system and an approach of single frequency networking is used, if users in different cells transmit and receive data via the same sub-carrier, signals transmitted and received by users in adjacent cells interference with each other.

To alleviate the interference between signals of multiple users in multiple cells when the OFDM system employs the approach of single frequency networking, the applicant has proposed Block Repeat (BR) transmission solutions in Chinese Patent Application No. 200710063115.5, including solutions of Block Repeat Division Multiplex (BRDM) and Block Repeat Division Multiple Access (BRDMA). The combinations of such BR transmission solutions with OFDM may be referred to as Block Repeat OFDM (BR-OFDM) and Block Repeat OFDMA (BR-OFDMA), respectively. The Block Repeat transmission solution is implemented through the repeat of the basic time and frequency resource block units, and does not limit the modulation and multiple access approaches at the physical layer. Therefore, the Block Repeat Division Multiple Access solutions can be combined with various basic multiple access approaches to construct various multiple access transmission solutions. For example, the combination of the Block Repeat Division Multiple Access solution with Interleaved FDMA (IFDMA) results in a BR-IFDMA solution, and the combination of the Block Repeat Division Multiple Access solution with DFT-Spread OFDM (DFT-S-OFDM) results in a BR-DFT-S-OFDM solution. Typically, the IFDMA and DFT-S-OFDM may be generally referred to as Single-Carrier FDMA (SC-FDMA), and thus the combination of BRDM with SC-FDMA may be referred to as BR-SC-FDMA.

FIG. 4 shows the structure of BR-OFDM physical resources of a single user. As shown, a Block Unit (BU) is a basic unit for Block Repeat, and one BU is repeated for 6 times in FIG. 4, resulting in BU1, BU2, . . . , BU6, that is, 6 BUs transmit the same data. The times for which a block is repeated is referred to as Repeat Factor (RF), which is 6 in the present example. Each of the repeated BUs is weighted using a weight factor, and a BR weight factor sequence (or referred to as a Repeat Code (RC)) of $C_0 C_1 \ldots, C_{RF-1}$ is provided by the transmitting side. In the BR transmission, BU are weighed, repeated and mapped into designated time and frequency positions.

Generally, however, the RC sequences of BR signals occupying the same time and frequency resources are not orthogonal, or the orthogonality of the received signals is lost due to a channel change although the RC sequences are orthogonal, the orthogonality of different user signals cannot be ensured at the receiver. As a result, there exists Multiple Access Interference and inter-symbol interference between the various user signals after the BR demodulation at the receiver.

SUMMARY OF THE INVENTION

Embodiments of the invention provide a method and device for multi-user detecting of an OFDM transmission signal, to effectively eliminate Multiple Access Interference and inter-symbol interference caused because multiple users (or multiple cells) occupy the same time and frequency resources to transmit signals.

A method for multi-user detecting of an Orthogonal Frequency Division Multiplexing, OFDM, transmission signal, comprising:

combining received signals at positions of time and frequency symbols from all the multiple repeated Block Units corresponding to the same data symbol into a received data sequence;

determining a combined repeated channel response sequence array corresponding to the received data sequence; and detecting the received data sequence using the combined repeated channel response sequence array to obtain multi-user data symbols.

A device for multi-user detecting of an Orthogonal Frequency Division Multiplexing, OFDM, transmission signal, comprising:

a first unit, which is configured to combine the received signals at positions of time and frequency symbols from all the multiple repeated Block Units corresponding to the same data symbol into a received data sequence;

a second unit, which is configured to determine a combined repeated channel response sequence array corresponding to the received data sequence; and a third unit, which is configured to detect the received data sequence using the combined repeated channel response sequence array, to obtain the multi-user data symbols.

In the method and device for multi-user detecting of an OFDM transmission signal, signals are optimally or sub-optimally detected using the combined repeated channel response sequence array of multiple users at the receiving side in a multi-user Block Repeat transmission system, that is, information of all users are fully utilized to perform the detection and separation of the signals, and the separation of all user signals is performed as a uniform correlating process. As a result, the Multiple Access Interference and InterSymbol Interference caused by transmitting signals using the same time and frequency resources during the transmission of multi-user Block Repeat signals is alleviated significantly.

DETAILED DESCRIPTION OF THE EMBODIMENTS

Embodiments of the invention provide a method and device for multi-user detecting of an OFDM transmission signal, in which received signals at positions of time and frequency symbols from all the multiple repeated BUs corresponding to the same data symbol are combined into a received data sequence, a combined repeated channel response sequence array corresponding to the received data sequence is determined, and the received data sequence is detected using the combined repeated channel response sequence array to obtain the data symbols of multiple users.

The embodiments of the invention are applicable to not only a BR transmission solution combining the BR transmission with OFDM, i.e. the BR-OFDM transmission solution, but also BR transmission solutions combining the BR transmission with individual Multiple Access manners, such as the BR-OFDMA transmission solution combining the BR transmission with the OFDMA technology, and BR-SC-FDMA combining the BR transmission with SC-FDMA.

Figure 6A:
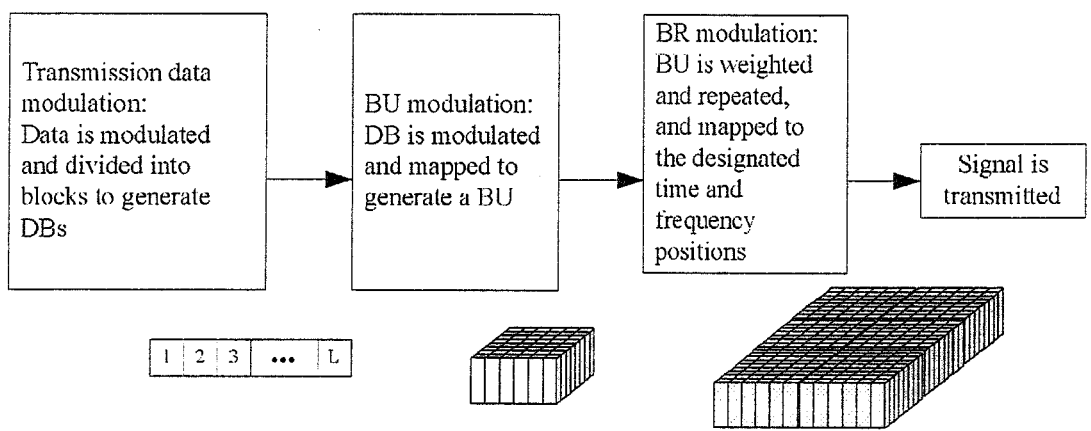
FIG. 6A is a block diagram of a first transmitting system solution based on BR transmission according to an embodiment of the invention.
Figure 6B:
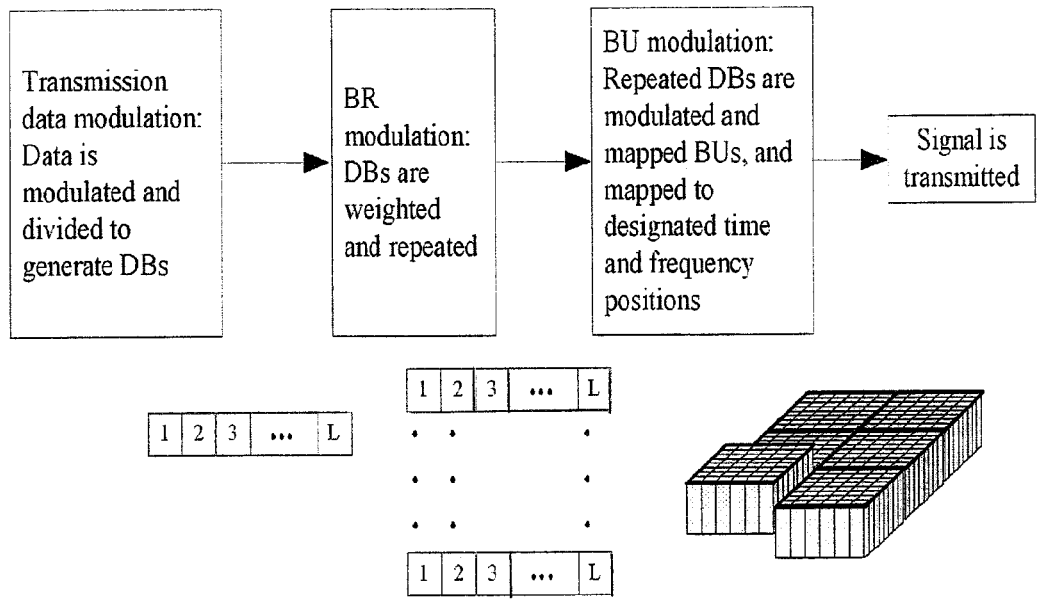
FIG. 6B is a block diagram of a second transmitting system solution based on BR transmission according to an embodiment of the invention.

The embodiments of the invention are described by way of example of the combination of the BR transmission with OFDMA, i.e. BR-OFDMA. The processing at a signal transmitter is now described. At the signal transmitter, transmission data is subjected to three stages of modulation to generate a transmission signal, and the transmission data is required to be subjected to channel coding, rate matching and combining and mapping to satisfy BR transmission and channel requirements. The corresponding BR-OFDMA signal can be transmitted through a transmission system as shown in FIG. 6A or 6B.

The three stages of modulation of a BR-OFDMA signal are described below with reference to the transmission system shown in FIG. 6A.

The first stage of modulation applies to modulate the transmission data. The transmission data is modulated and divided into blocks to generate Data symbol Blocks (DBs). At the present stage, the transmission data is subjected to ordinary digital modulation, such as Binary Phase Shift Key (BPSK), Quadrature Phase Shift Keying (QPSK), 16 Quadrature Amplitude Modulation (QAM), 64 Quadrature Amplitude Modulation. The division of the transmission data determines data to be transmitted in each BU based on the size of the BU. If the data to be transmitted in a BU includes L data symbols, the DB obtained from the first stage of data modulation may be denoted by $d^{(k_u)}=[d_0^{(k_u)}, d_1^{(k_u)}, \ldots, d_{L-1}^{(k_u)}]$, where $k_u=1, 2, \ldots, K_u$ and represents the $k_u$th user (or cell). The nth symbol in the data of the $k_u$th user (or cell) may be denoted by $d_n^{(k_u)}=sb_{i_n,j_n}^{(k_u)}$, $n=0, 1, \ldots, L-1$; and the nth symbols in the data of all the $K_u$ users (or cells) may be denoted as follows:

$$d_n = \begin{bmatrix} d_n^{(0)} \\ d_n^{(1)} \\ \vdots \\ d_n^{(K_u-1)} \end{bmatrix} = [d_n^{(0)}, d_n^{(1)}, \ldots, d_n^{(K_u-1)}]^T,$$

where $n = 0, 1, \ldots, L-1$

In the second stage of BU modulation, the DB is subjected BU modulation and mapping to generate a BU. In the present stage, the DB $d^{(k_u)}$ is mapped to a PRB according to defined correspondence relationship, and other symbols such as pilot symbols are inserted to the DB, so that the receiver can easily demodulate the signal through the channel estimation of the inserted pilot symbols.

In the case of a system based on OFDM, the BU is a time and frequency resource unit in the time and frequency domains, and consists of $N_T$ symbols in the time domain and $N_F$ carriers in the frequency domain. The time and frequency symbols of a basic BU (the total number of which is $N=N_T \times N_F$, including data symbols and pilot symbols) may be denoted (in terms of baseband representation of all the time and frequency symbols) as follows:

$$sb^{(k_u)} = \begin{bmatrix} sb_{0,0}^{(k_u)} & sb_{0,1}^{(k_u)} & \ldots & sb_{0,N_F-1}^{(k_u)} \\ sb_{1,0}^{(k_u)} & sb_{1,1}^{(k_u)} & \ldots & sb_{1,N_F-1}^{(k_u)} \\ \vdots & \vdots & \ldots & \vdots \\ sb_{N_T-1,0}^{(k_u)} & sb_{N_T-1,1}^{(k_u)} & \ldots & sb_{N_T-1,N_F-1}^{(k_u)} \end{bmatrix}$$

With the given all of the corresponding time and frequency symbols in the basic BU, a signal in the time or frequency domain of the basic UB can be generated using the OFDM manner, and such signal is one limited within the BU in both the time and frequency domains.

The transmitter adds pilot symbols to the BU to generate a completed BU. Each BU can possess its own dedicated pilot symbols, which construct a self-contained PRB capable of being demodulated independently, so that the receiver can demodulate correlatively the signal of the BU through the channel estimation of the pilot symbols in the BU. For each user, the pilot symbols and their occupied time and frequency grids in each BU are predefined or known to the transmitter and the receiver.

The third stage of modulation is BR modulation, in which the BU is weighted and repeated, and mapped to the designated time and frequency positions.

The repeat modulation of the basic BU generates repeated BUs. After the weight and repeat modulation, time and frequency symbols of the ith ($i=1, 2, \ldots, RF-1$) repeated BU can be denoted as follows:

$$s^{(i,k_u)} = \begin{bmatrix} s_{0,0}^{(i,k_u)} & s_{0,1}^{(i,k_u)} & \ldots & s_{0,N_F-1}^{(i,k_u)} \\ s_{1,0}^{(i,k_u)} & s_{1,1}^{(i,k_u)} & \ldots & s_{1,N_F-1}^{(i,k_u)} \\ \vdots & \vdots & \ldots & \vdots \\ s_{N_T-1,0}^{(i,k_u)} & s_{N_T-1,1}^{(i,k_u)} & \ldots & s_{N_T-1,N_F-1}^{(i,k_u)} \end{bmatrix}$$

When the same weight factor is applied to the pilot symbols and the data symbols, the time and frequency symbols of the repeated BUs can be denoted as follows:

$$s^{(i,k_u)} = C_i^{(k_u)} \cdot sb^{(k_u)} = C_i^{(k_u)} \cdot \begin{bmatrix} sb_{0,0}^{(k_u)} & sb_{0,1}^{(k_u)} & \ldots & sb_{0,N_F-1}^{(k_u)} \\ sb_{1,0}^{(k_u)} & sb_{1,1}^{(k_u)} & \ldots & sb_{1,N_F-1}^{(k_u)} \\ \vdots & \vdots & \ldots & \vdots \\ sb_{N_T-1,0}^{(k_u)} & sb_{N_T-1,1}^{(k_u)} & \ldots & sb_{N_T-1,N_F-1}^{(k_u)} \end{bmatrix}$$

where, $C_i^{(k_u)}$ denotes a block RC sequence.

In the signal representation above, the repeated BUs are weighted entirely. Therefore, in the case that dedicated pilot symbols are adopted, the same weight factor applies to the data symbols and pilot symbols within each of the repeated BUs. In this case, the receiver can demodulate signals through the channel estimation of the dedicated pilot symbols, without obtaining the RC sequence of the repeated BU in advance. In addition, it is possible not to weight the pilot symbols.

If the OFDM signal corresponding to a repeated BU $s^{(i,k_u)}$, i.e. a signal limited within one repeated BU in both the time and frequency domains, is denoted by $s^{(i,k_u)}(t)$ at the time and frequency origins, adjusting of a repeated BU to the designated time and frequency positions $(t_i, f_i)$ means a time offset $(t_i)$ and a frequency offset $(f_i)$, i.e. $s^{(i,k_u)}(t-t_i)e^{j2\pi f_i(t-t_i)}$.

The time and frequency positions of the repeated BU are denoted by $(t_i, f_i)$, where $i=0, 1, 2, \ldots, RF-1$. For the transmission of the repeated BU, the basic repeat BU is mapped to the designated time and frequency positions after the repeat modulation. Thus, the entire transmission signal can be denoted as follows:

$$\begin{aligned} s_{Block\ Repeat}^{(k_u)}(t) &= s^{(0,k_u)}(t-t_0)e^{j2\pi f_0(t-t_0)} + s^{(1,k_u)}(t-t_1)e^{j2\pi f_1(t-t_1)} + \\ &\quad \ldots + s^{(RF-1,k_u)}(t-t_{RF-1})e^{j2\pi f_{RF-1}(t-t_{RF-1})} \\ &= \sum_{i=0}^{RF-1} s^{(i,k_u)}(t-t_i)e^{j2\pi f_i(t-t_i)} \end{aligned}$$

The three stages of modulation on the BR-OFDMA signal are described below with reference to the system shown in FIG. 6B.

The first stage of modulation refers to transmission data modulation, in which the transmission data is modulated and divided into blocks to generate DBs.

The second stage of modulation refers block repeat modulation, in which weighted repeat modulation is applied to the generated DBs using a weight factor sequence, so that several repeated DBs corresponding to each of the generated DBs are generated.

The third stage of modulation refers to BU modulation, in which each of the repeated DBs is modulated and mapped as repeated BUs, which are in turn mapped to the designated time and frequency positions.

Detailed implementation of the system shown in FIG. 6B is similar to that of the system shown in FIG. 6A and is not described herein in detail.

In some embodiments, a further stage of interleaving process may be introduced to the data symbols at all the time and frequency grid positions in each of the repeated BUs, and each of the repeated BUs can use an independent interleaver, or each of the users can use a different interleaver, thus, the receiver needs to be capable of de-interleaving accordingly. It will be appreciated that the use of the interleaver merely disturbs the spatial order of the extended data symbol chip in the respective BUs and obtains an interleaving gain in some cases, and therefore has no impact on the implementation of other parts of the invention.

In some embodiments, in the case of a single user, the weight factors of various repeated BUs may be the same or different. If the weight factors are the same, the demodulation processing can be simplified.

For example, data symbols (the number of which is L) to be transmitted via a BU are denoted as $d=[d_0, d_1, \ldots, d_{L-1}]$, and the data d is mapped into the BU based on a defined correspondence relationship. Symbols in one BU, including data symbols and pilot symbols and having a number of $N=N_T \times N_F$, are denoted as follows:

$$s = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}$$

If a signal in the time domain corresponding to the BU, which is one limited within one BU in both the time and frequency domains, is denoted by $s_{UB}(t)$, then adjusting of the BU to the designated time and frequency positions $(t_i, f_i)$ means a time offset $(t_i)$ and a frequency offset $(f_i)$, i.e. $s_{UB}(t-t_i)e^{j2\pi f_i(t-t_i)}$.

The time and frequency positions of the BR are denoted by $(t_i, f_i)$, where $i=0, 1, \ldots, RF-1$. In the BR transmission, the BU is weighted and repeated (through the BR weight factor sequence of $C_0C_1 \ldots C_{RF-1}$) and mapped to the designated time and frequency positions, and the signal subjected to the BR may be denoted as follows:

$$s_{Block\ Repeat}(t) = C_0 s_{UB}(t-t_0)e^{j2\pi f_0(t-t_0)} + C_1 s_{UB}(t-t_1)e^{j2\pi f_1(t-t_1)} + \ldots + C_{RF-1}s_{UB}(t-t_{RF-1})e^{j2\pi f_{RF-1}(t-t_{RF-1})}$$

$$= \sum_{i=0}^{RF-1} C_i s_{UB}(t-t_i)e^{j2\pi f_i(t-t_i)}$$

Figure 1:
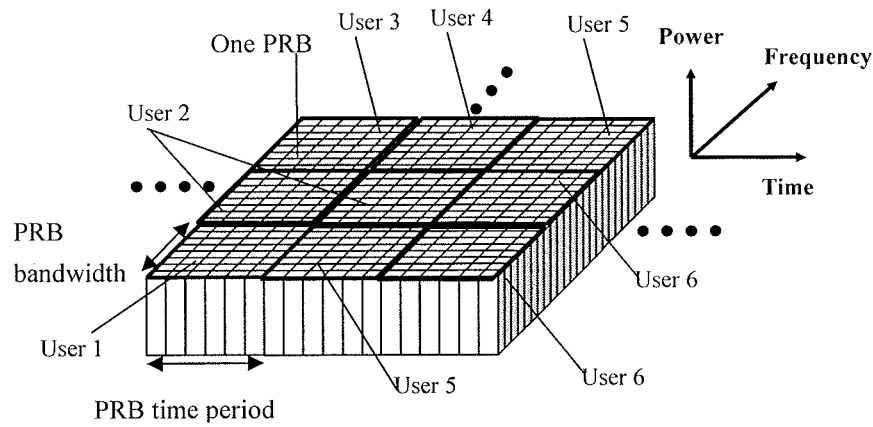
FIG. 1 is a schematic diagram showing channel resources for an OFDM modulation manner in the prior art.
Figure 2:
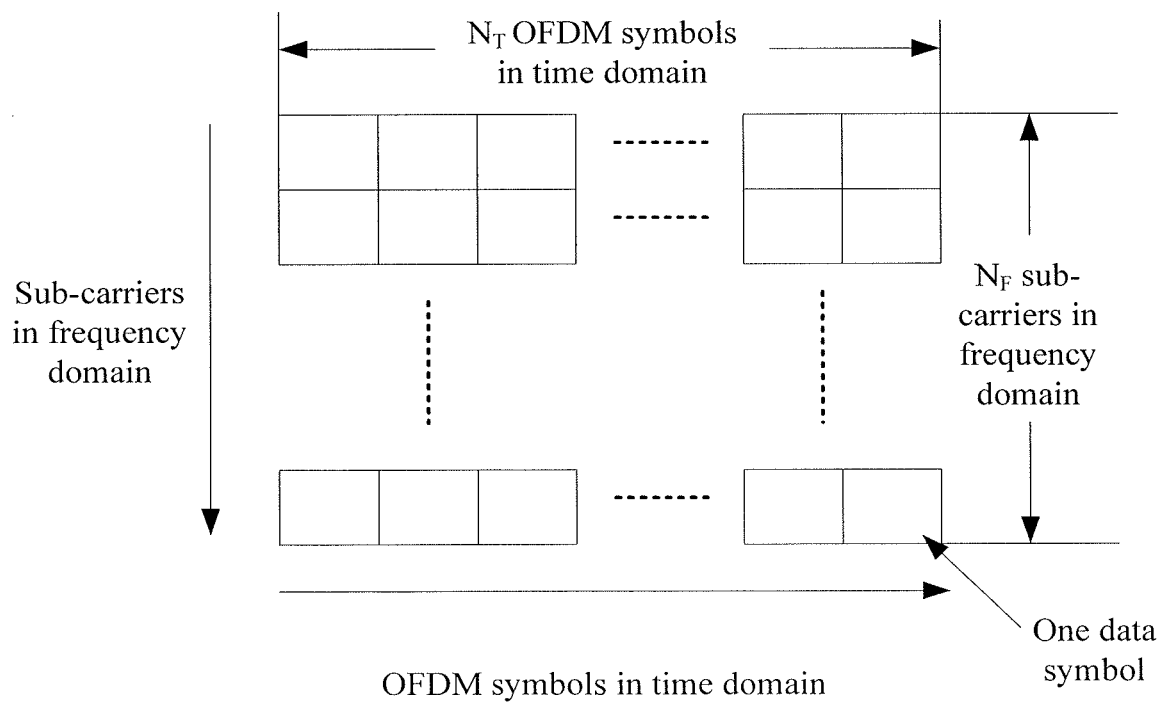
FIG. 2 is a schematic diagram showing a physical resource block for an OFDM modulation manner in the prior art.
Figure 3:
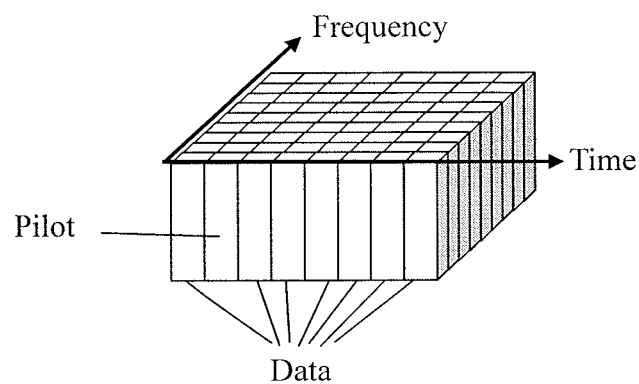
FIG. 3 is a schematic diagram showing a pilot in a physical resource block in the prior art.
Figure 4:
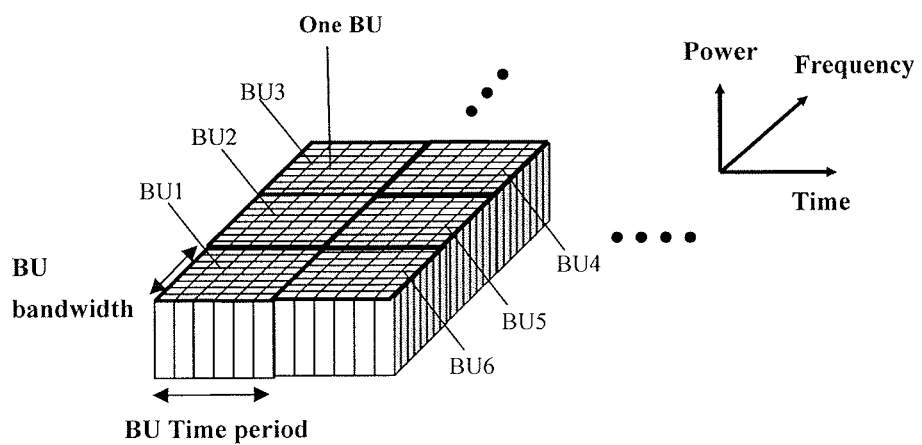
FIG. 4 is a schematic diagram showing BR transmission with a single user.
Figure 5:
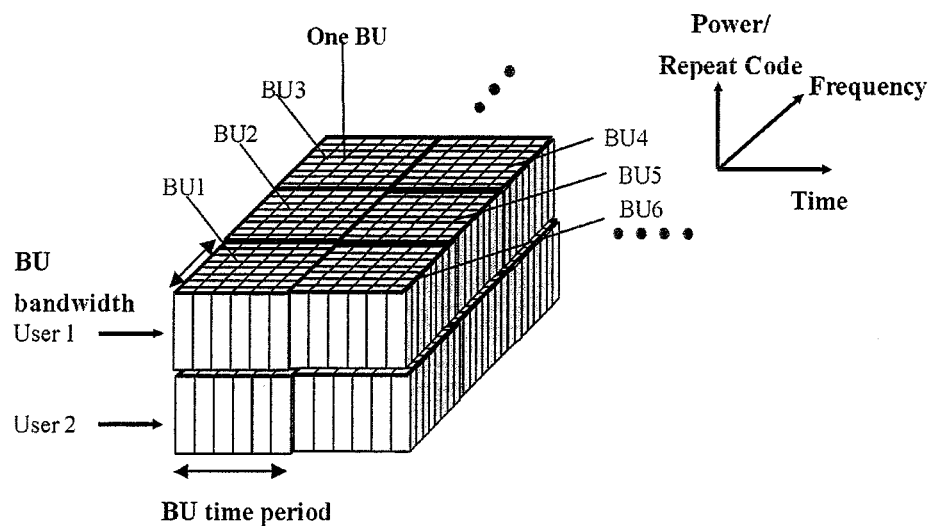
FIG. 5 is a schematic diagram showing BR transmission with two users.

FIG. 5 shows BR-OFDM physical resources of multiple users. In the present example, two users occupy the same time and frequency channel resources for BR transmission. In the multi-user BR transmission, each of the users transmits a signal in a single-user manner, but each of the users has a different BR weight factor sequence of $C_0C_1 \ldots C_{RF-1}$ (which is also referred to as RC sequence) if the users occupy the same time and frequency channel resources. A receiver separates the signals occupying the same time and frequency resources according to the different RC sequences. As shown in FIG. 5, a user 1 is at the upper side and a user 2 is at the lower side along the axis of power/RC sequence. It is noted that the user herein also refers to a channel, for example, an actual User Equipment can transmit a signal via multiple channels.

If multiple users (including multiple users in different cells) occupy the same time and frequency channel resources for the BR transmission, the receiver separates the signals occupying the same time and frequency resources according to the different RC sequences. In this case, if the RC sequences of the users are orthogonal and the orthogonality of the signals of the various users is not lost by the transmission channels, the receiver can completely separate the signals of different users through the orthogonality of the RC sequences.

Figure 7:
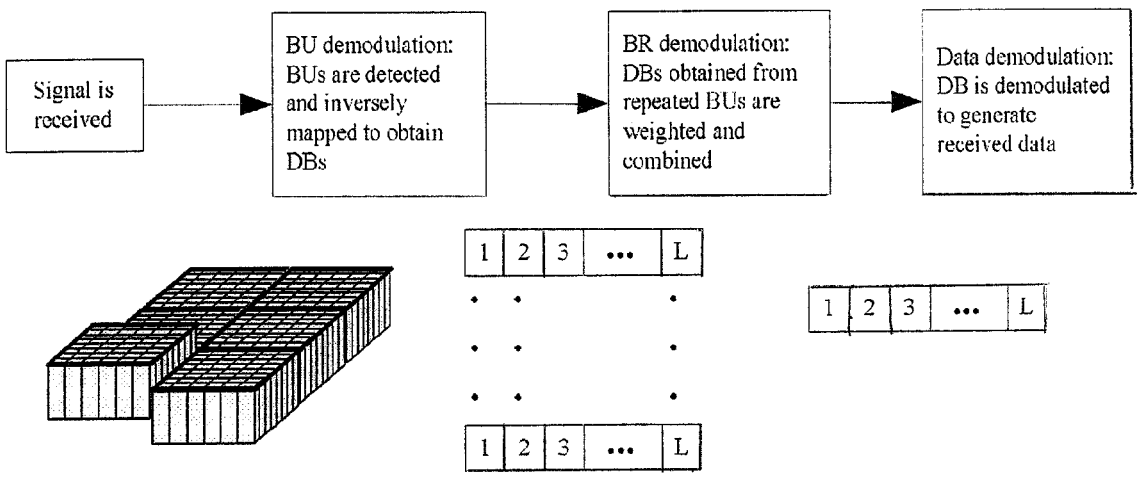
FIG. 7 is a block diagram of a receiving system based on BR transmission according to an embodiment of the invention.

FIG. 7 is a block diagram of a receiving system for BR-OFDMA signals. After receiving a BR signal, the receiver subjects the received BR signal to three stages of demodulation to obtain the received data.

The first stage of demodulation is BU demodulation, in which each of the repeated BUs is detected and inversely mapped at the designated time and frequency positions to obtain DBs. In the present stage of demodulation, a channel estimator may be used to conduct the channel estimation using the pilot symbols, to obtain a channel estimation response of the received signal.

The second stage of demodulation is BR demodulation, in which the DBs obtained from all the repeated BUs are combined to obtain a DB to be demodulated.

The third stage of demodulation is data demodulation, in which the DB to be demodulated is demodulated to generate the final received data. In the present stage of demodulation, ordinary digital demodulation is performed according to the modulation at the transmitter, such as BPSK, QPSK, 16QAM, and 64QAM.

The time and frequency signal corresponding to the received ith (where $i=0, 1, 2, \ldots, RF-1$) repeated BU may be denoted as follows:

$$e^{(i)} = \begin{bmatrix} e_{0,0}^{(i)} & e_{0,1}^{(i)} & \cdots & e_{0,N_F-1}^{(i)} \\ e_{1,0}^{(i)} & e_{1,1}^{(i)} & \cdots & e_{1,N_F-1}^{(i)} \\ \vdots & \vdots & \cdots & \vdots \\ e_{N_T-1,0}^{(i)} & e_{N_T-1,1}^{(i)} & \cdots & e_{N_T-1,N_F-1}^{(i)} \end{bmatrix}, i = 0, 1, 2, \ldots, RF-1$$

The received ith repeated BU has the following relationship with the transmitted data and channel.

$$e^{(i)} = \sum_{k_u=0}^{K_u-1} \begin{bmatrix} s_{0,0}^{(i,k_u)} \cdot h_{0,0}^{(i,k_u)} & s_{0,1}^{(i,k_u)} \cdot h_{0,1}^{(i,k_u)} & \cdots & s_{0,N_F-1}^{(i,k_u)} \cdot h_{0,N_F-1}^{(i,k_u)} \\ s_{1,0}^{(i,k_u)} \cdot h_{1,0}^{(i,k_u)} & s_{1,1}^{(i,k_u)} \cdot h_{1,1}^{(i,k_u)} & \cdots & s_{1,N_F-1}^{(i,k_u)} \cdot h_{1,N_F-1}^{(i,k_u)} \\ \vdots & \vdots & \cdots & \vdots \\ s_{N_T-1,0}^{(i,k_u)} \cdot h_{N_T-1,0}^{(i,k_u)} & s_{N_T-1,1}^{(i,k_u)} \cdot h_{N_T-1,1}^{(i,k_u)} & \cdots & s_{N_T-1,N_F-1}^{(i,k_u)} \cdot h_{N_T-1,N_F-1}^{(i,k_u)} \end{bmatrix} + n^{(i)}$$

where, $n^{(i)}$ denotes noise and interference in the ith repeated BU, $s_{N_T-1,N_F-1}^{(i,k_u)}$ denotes time and frequency symbols of the transmitted ith (where $i=1, 2, \ldots, RF-1$) repeated BU, and $h_{N_T-1,N_F-1}^{(i,k_u)}$ denotes a channel response of the ith (where $i=1, 2, \ldots, RF-1$) repeated BU.

A component of each of the time and frequency symbols is denoted as follows:

$$e_{n_t n_f}^{(i)} = \sum_{k_u}^{K_u-1} s_{n_t n_f}^{(k_u,i)} \cdot h_{n_t n_f}^{(i,k_u)} + n_{n_t n_f}^{(i)}, i = 0, 1, 2, \ldots, RF-1;$$

and the part corresponding to a data symbol can be denoted as follows:

$$e_n^{(i)} = \sum_{k_u} C_i^{(k_u)} \cdot d_n^{(k_u)} \cdot h_n^{(i,k_u)} + n_n^{(i)},$$

$$i = 1, 2, \ldots, RF-1; n = 0, 1, \ldots, L-1.$$

A signal related to the nth data symbol from all the repeated BUs may be represented in a matrix format as follows:

$$e_n = \begin{bmatrix} e_n^{(0)} \\ e_n^{(1)} \\ \vdots \\ e_n^{(RF-1)} \end{bmatrix} = [e_n^{(0)}, e_n^{(1)}, \ldots, e_n^{(RF-1)}]^T,$$

where $n = 0, 1, \ldots, L-1$ $$d_n = \begin{bmatrix} d_n^{(0)} \\ d_n^{(1)} \\ \vdots \\ d_n^{(K_u-1)} \end{bmatrix} = [d_n^{(0)}, d_n^{(1)}, \ldots, d_n^{(K_u-1)}]^T,$$

where $n = 0, 1, \ldots, L-1$ where, $e_n$ denotes the received data, and $d_n$ denotes the transmitted data.

A combined repeated response sequence $A_n$ corresponding to the received data is denoted as follows:

$$A_n = \begin{bmatrix} a_n^{(0,0)} & a_n^{(0,1)} & \ldots & a_n^{(0,K_u-1)} \\ a_n^{(1,0)} & a_n^{(1,1)} & \ldots & a_n^{(1,K_u-1)} \\ \vdots & \vdots & \vdots & \vdots \\ a_n^{(RF-1,0)} & a_n^{(RF-1,1)} & \ldots & a_n^{(RF-1,K_u-1)} \end{bmatrix}$$

$$= \begin{bmatrix} C_0^{(0)} \cdot h_n^{(0,0)} & C_0^{(1)} \cdot h_n^{(0,1)} & \ldots & C_0^{(K_u-1)} \cdot h_n^{(0,K_u-1)} \\ C_1^{(0)} \cdot h_n^{(1,0)} & C_1^{(1)} \cdot h_n^{(1,1)} & \ldots & C_1^{(K_u-1)} \cdot h_n^{(1,K_u-1)} \\ \vdots & \vdots & \vdots & \vdots \\ C_{RF-1}^{(0)} \cdot h_n^{(RF-1,0)} & C_{RF-1}^{(1)} \cdot h_n^{(RF-1,1)} & \ldots & C_{RF-1}^{(K_u-1)} \cdot h_n^{(RF-1,K_u-1)} \end{bmatrix}$$

where, $h_{n_t n_f}^{(i,k_u)}$ denotes a channel estimation response, and $C_R$ denotes an RC.

Thus, $e_n = A_n d_n + n_n$, $n = 0, 1, \ldots, L-1$, which reflects a relationship of $e_n$ with $d_n$ and $A_n$.

Figure 8:
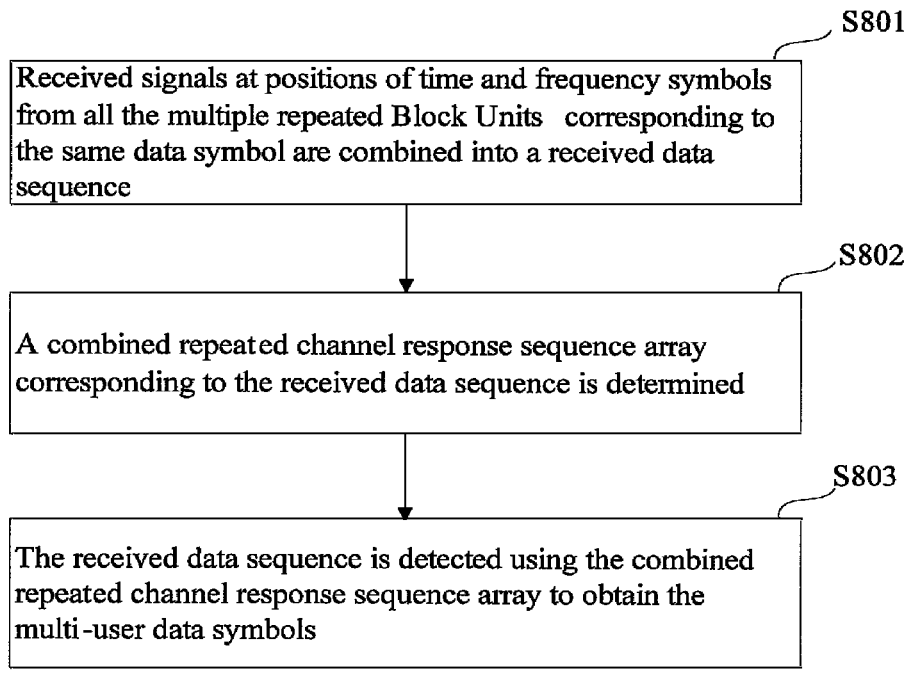
FIG. 8 is a flow chart of a method for multi-user detecting of an OFDM transmission signal according to a first embodiment of the invention.

A method for multi-user detecting of an OFDM transmission signal is provided according to a first embodiment of the invention, and the method is used to detect the time and frequency symbols in the received repeated BUs based on the above process. A particular detecting process includes: a received data sequence generating process, a combined repeated channel response sequence array generating process, and a received data sequence detecting process. An implementation of the method for multi-user detecting of an OFDM transmission signal is described in detail with reference to FIG. 8 below.

Process S801: Received signals at positions of time and frequency symbols from all the multiple repeated Block Units corresponding to the same data symbol are combined into a received data sequence. Particularly, process S801 includes:

receiving broadband OFDM data symbols;

according to predefined repeated BUs, dividing and allocating effective data in the received OFDM data symbols to multiple repeated BUs;

determining positions of time and frequency symbols corresponding to the same data symbol within all the repeated BUs; and combining the received signals at positions of time and frequency symbols from all the multiple repeated Block Units corresponding to the same data symbol into the received data sequence.

Determining the positions of time and frequency symbols corresponding to the same data symbol within the respective repeated BUs may be performed in the following two approaches.

Approach 1: If data in the repeated BUs is to be interleaved, an interleaver is used to interleave and sort the data in the repeated BUs, the positions of time and frequency symbols at all the multiple repeated Block Units corresponding to the same data symbol are determined according to the data sequence obtained from the interleaving and sorting, and the received signals at the positions of time and frequency symbols from all the multiple repeated Block Units corresponding to the same data symbol are combined into the received data sequence. The interleavers for interleaving and sorting used by the respective repeated BUs may be the same or independently different.

Approach 2: If data in the repeated BUs is not to be interleaved, in the received signal, the positions of the time and frequency symbols corresponding to the same transmitted data symbol within the respective repeated BUs remain unchanged. The received signals at the determined positions of the time and frequency symbols are used as the received data sequence.

Process S802: A combined repeated channel response sequence array corresponding to the received data sequence is determined.

Process S802 may be implemented in the following two approaches.

Approach 1: The combined repeated channel response sequence of each user is obtained from an RC sequence, which is a combination of weight factors used for weighting multiple repeated BUs according to the same data symbol of the user, and a repeated channel response sequence, which is a combination of channel responses of the repeated BUs of the user; A combination of repeated channel response sequences of multiple users constructs the combined repeated channel response sequence array corresponding to the received data sequence. In a particular implementation, the combined repeated channel response sequence array corresponding to the received data sequence can be derived from the following formula:

$$[A_n^{(i)} = [C_0^{(i)} \cdot h_n^{(0,i)}, \quad C_1^{(i)} \cdot h_n^{(1,i)}, \quad \ldots, \quad C_{RF-1}^{(i)} \cdot h_n^{(RF-1,i)}]^T$$

where, $A_n$ denotes the combined repeated channel response sequence array corresponding to the users for joint detecting, i denotes the sequence number of a user, $C_0^{(i)}, C_1^{(i)}, \ldots, C_{RF-1}^{(i)}$ denotes the RC sequence which is a combination of weight factors used for weighting the repeated BUs according to the same data symbol of the ith user, $h_n^{(RF-1,i)}$ denotes a channel response in the RFth repeated BU of the ith user, the sequence of $h_n^{(0,i)}, h_n^{(1,i)}, \ldots, h_n^{(RF-1,i)}$ may be referred to as the repeated channel response sequence which has a meaning different from general channel impulse response time sequence, and n denotes the sequence number of the nth data symbol in the BU.

Approach 2: The combined repeated channel response sequence of each user is obtained from an RC sequence which is a combination of weight factors used for weighting multiple repeated BUs according to the same data symbol of the user, a repeated channel response sequence which is a combination of channel responses of the repeated BUs of the user, and a scrambling code sequence which is a combination of scrambling codes in the repeated BUs for the user; and a combination of repeated channel response sequences of multiple users constructs the combined repeated channel response sequence array corresponding to the received data sequence. In a particular implementation, the combined repeated channel response sequence array corresponding to the received data sequence can be derived from the following formula:

$$A_n^{(i)} = [R_0^{(i)} \cdot C_0^{(i)} \cdot h_n^{(0,i)}, R_1^{(i)} \cdot C_1^{(i)} \cdot h_n^{(1,i)}, \ldots, R_{RF-1}^{(i)} \cdot C_{RF-1}^{(i)} \cdot h_n^{(RF-1,i)}]^T$$

where, $A_n$, $C_{RF-1}^{(i)}$ and $h_n^{(RF-1,i)}$ are similar with those in Approach 1, $R^{(i)}$ denotes the scrambling code sequence which is a combination of scrambling codes in the repeated BUs for the user, and the same scrambling code sequence may be used by the respective users within the same cell.

The above-described channel responses of the repeated BUs of each user can be obtained from channel estimation on the user dedicated pilot symbols inserted in the repeated BUs. For example, channel responses of the pilot symbols can be obtained from the channel estimation on the user dedicated pilot symbols inserted in the repeated BUs, and the channel response of the received signals at the positions of time and frequency symbols in the repeated BUs for the user can be obtained by interpolation processing using the obtained channel responses of the pilot symbols.

Process S803: The received data sequence is detected using the combined repeated channel response sequence array to obtain the multi-user data symbols.

In particular, process S803 includes:

matched filtering of the received data sequence using the combined repeated channel response sequence array, and noise decorrelation processing on the received data sequence before the matched filtering; and processing a result obtained from the matched filtering with a Block Linear Equalizer method, to obtain the multi-user data symbols.

The Block Linear Equalizer method includes a Whitening Matched Filter method, a Zero-Forcing Block Linear Equalizer method and a Minimum Mean Square Error Block Linear Equalizer method.

The combined repeated channel response sequence array may be a combination of repeated channel response sequences of multiple users within the same cell or different cells. The multiple users are determined according the intensities of the received signals such as the user dedicated pilot sequence signal.

Figure 9:
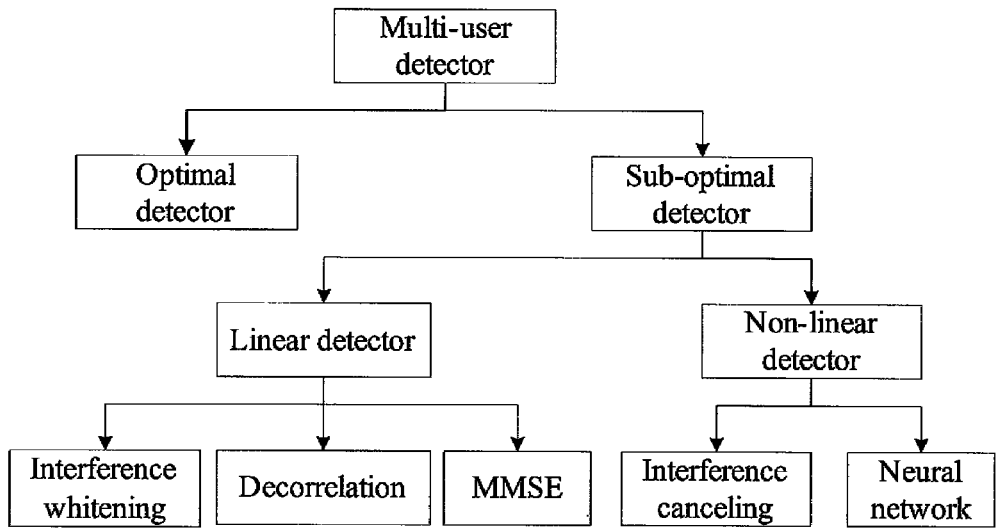
FIG. 9 is a schematic diagram showing the categories of the method for multi-user detecting of an OFDM transmission signal according to the first embodiment of the invention.

When the received data sequence is detected using the combined repeated channel response sequence array, either the optimal multi-user detecting technology or a sub-optimal multi-user detecting technology may be used, as shown in the block diagram in FIG. 9.

Figure 10:
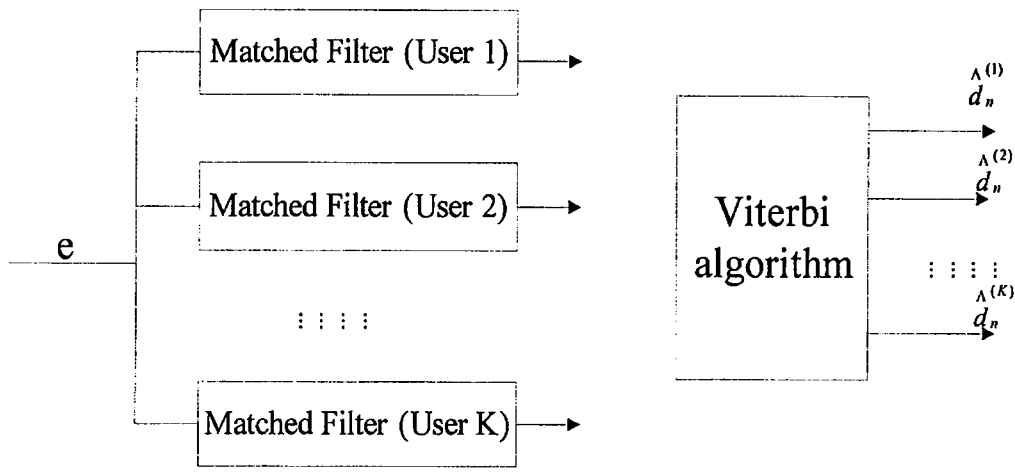
FIG. 10 is a diagram showing the structure of a model of the optimal multi-user detection technology according to the first embodiment of the invention.

FIG. 10 shows a model of the optimal multi-user detection technology, in which one combination with the highest likelihood is selected from all information combinations of all the users through a receiver based on the Maximum Likelihood Sequence Detection theory. If noise is low, the optimal detector has an error rate almost equal to that of a single-user system and has the optimal capability against the near-far effect. However, the optimal detector has a computation complexity increased in the order of $2^k$ as an increase of the number K of users, and is difficult to implement in practices.

The sub-optimal multi-user detection technology is divided into linear multi-user detection and nonlinear multi-user detection. In the linear multi-user detection, an appropriate linear transform is introduced to the traditional detector to reduce or eliminate multi-user interference or Multiple Access Interference, and the linear multi-user detection may include Minimum Mean Square Error (MMSE) detection, Decorrelation detection, Polynomial Expansion (PE), Multi-stage detection, and so on. The nonlinear multi-user detection may include Interference Cancellation detection, neural network detection, Decision Feedback detection, and so on.

Figure 11:
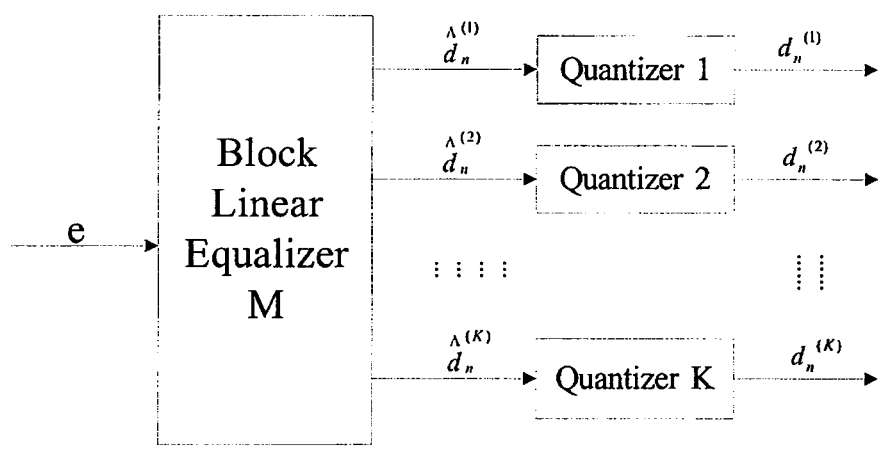
FIG. 11 is a schematic diagram showing the structure of a detector using a linear algorithm according to the first embodiment of the invention.

FIG. 11 shows the structure of a detector with a linear algorithm. Firstly, a Block Linear Equalizer M is arranged to detect a received signal $e_n$ of the respective users to obtain continuous estimated values $\hat{d}_n$ for K user transmitted symbols, then K quantizers are arranged to quantize the continuous values to obtain estimated discrete values of the user transmitted data symbols. The processing above may be represented in formulas below.

$$\hat{d}_n = M e_n,$$

$$d_n = Q\{\hat{d}_n\},$$

where, $Q\{\cdot\}$ denotes the quantization process. Substituting of $e_n = A_n d_n + n$ in $\hat{d}_n = M e_n$ obtains a formula below:

$$\hat{d}_n = M A_n d_n + M n = \text{diag}(MA_n) d_n + \overline{\text{diag}}(MA_n) d_n + M n$$

where, diag(X) denotes a diagonal matrix of the matrix X, i.e. a matrix keeping only diagonal elements of the matrix X, while $\overline{\text{diag}}(X)$ denotes a matrix keeping elements other than the diagonal elements of the matrix X, that is, the diagonal elements are set as zero but other elements remain. In the formula above, the first item represents a useful part, the second item represents Multiple Access Interference (MAI) and InterSymbol Interference, while the third item represents noise. In practices, the matrix M is selected under a certain rule such that the second and third items of the above formula have the least impact on the estimated values. Depending on the matrix M, a linear joint detection algorithm generally includes three method of a Whitening Matched Filter method, a Zero-Forcing Block Linear Equalizer method and a Minimum Mean Square Error Block Linear Equalizer method, which are described below in detail with reference to the Drawings.

1. The Whitening Matched Filter Method

In the traditional detector, it is assumed that additive noise n is Additive White Gaussian Noise (AWGN) and one group of Matched Filters (MFs) are included, then the continuous estimated value of a data vector can be denoted as follows:

$$\hat{d}_{n,MF} = A_n^{*T} e_n$$

That is, the received signals are subjected to MFs matching with the system matrix $A_n$. Developing of the formula above results in a formula below:

$$\hat{d}_n = A_n^{*T} A_n d_n + A_n^{*T} n = \text{diag}(A_n^{*T} A_n) d_n + \overline{\text{diag}}(A_n^{*T} A_n) d_n + A_n^{*T} n$$

where, the first item represents a useful part, the second item represent MAI and ISI, and the third represents noise due to the AWGN. As shown, the MAI and ISI are not eliminated in this method and are processed as noise.

If the additive noise n is not AWGN, a Pre-whitening filter is added ahead of the traditional detector, forming a so-called Whitening Matched Filter, and the continuous estimated value can be changed as follows:

$$\hat{d}_{n,WMF} = A_n^{*T} R_n^{-1} e_n$$

where, $R_n = E\{n \cdot n^{*T}\}$ represents a covariance matrix of the noise sequence n. The Cholesky decomposition of $R_n$ obtains a formula below:

$$R_n = L \cdot L^{*T}$$

where, L denotes a lower triangular matrix, thus $\hat{d}_n = A_n^{*T} R_n^{-1} e_n$ can be developed as follows:

$$\hat{d}_n = (L^{-1} A_n)^{*T} L^{-1} e_n$$

Figure 12:
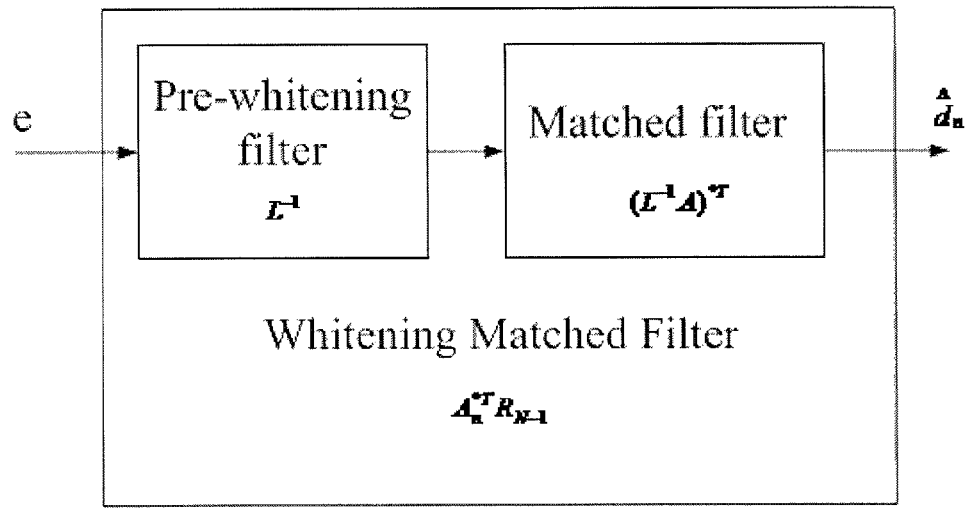
FIG. 12 is a schematic diagram showing the structure of a Whitening Matched Filter according to the first embodiment of the invention.

Through the computation of $L^{-1} e_n$, the additive noise n is whitened, because $E\{L^{-1} \cdot n \cdot (L^{-1} \cdot n)^{*T}\} = I$, where I denotes a unit matrix. The pre-whitened signals are passed to the corrected MF of $(L^{-1} A_n)^{*T}$, and the structure of WMF is shown in FIG. 12. The development of $\hat{d}_{n,WMF} = A^{*T} R_n^{-1} e_n$ obtains a formula below:

$$\hat{d}_{n,WMF} = A_n^{*T} R_n^{-1} A_n d + A_n^{*T} R_n^{-1} n$$

$$= \text{diag}(A_n^{*T} R_n^{-1} A_n) d + \overline{\text{diag}}(A_n^{*T} R_n^{-1} A_n) d + A_n^{*T} R_n^{-1} n$$

where, the first item represents a useful part, the second item represent MAI and ISI, and the third represents noise caused due to the additive noise n, here, the correlation of the caused noise is a covariance matrix $A_n^{*T}(R_n^{-1})^{*T} A_n$ thereof. As shown, the MAI and ISI cannot be eliminated through data detection using the WMF method.

If the additive noise n is AWGN, that is, its covariance matrix satisfies $R_n = \sigma^2 I$, $\hat{d}_{n,WMF} = A_n^{*T} R_n^{-1} e_n$ can be represented as:

$$\hat{d}_{n,WMF} = \frac{A_n^{*T}}{\sigma^2} e_n.$$

Thus, the WMF acts as the traditional detector based on a group of MFs, and differentiates from any ordinary MF because the system matrix has taken channel characteristics into consideration. Therefore, the Matched Filter in the embodiment is matched with codes and channels, and thus has a higher performance than ordinary code matched filters.

2. The Zero-Forcing Block Linear Equalizer Method

The Zero-Forcing Block Linear Equalizer method refers to the optimally weighted Least Square Estimate based on Gauss-Markov principles. Through $\|e_n - A_n \hat{d}_{n,ZF-BLE}\|^2 \to 0$ or $Q(\hat{d}_{n,ZF-BLE}) = (e_n - A_n \hat{d}_{n,ZF-BLE})^{*T} R_n^{-1} (e_n - A_n \hat{d}_{n,ZF-BLE}) \to 0$, the unbiased estimate of the continuous value thereof can be denoted by $\hat{d}_{n,ZF-BLE} = d_n + (A_n^{*T} R_n^{-1} A_n)^{-1} A_n^{*T} R_n^{-1} n$.

As shown, this method can completely eliminate the MAI and ISI, thus, the equalizer of $(A_n^{*T} R_n^{-1} A_n)^{-1} A_n^{*T} R_n^{-1}$ is referred to as Zero-Forcing Equalizer. In practices, the probability of matrix $A_n^{*T} R_n^{-1} A_n$ being singular is zero, as a result, there is always an inverse of the matrix.

If the noise n is AWGN, the above formula develops as follows:

$$\hat{d}_{n,ZF-BLE} = (A_n^{*T} A_n)^{-1} A_n^{*T} e_n = d_n + (A_n^{*T} A_n)^{-1} A_n^{*T} n$$

The Cholesky decomposition of the matrix $A_n^{*T} R_n^{-1} A_n$ results in $A_n^{*T} R_n^{-1} A_n = (\Sigma H)^{*T} \cdot \Sigma H$, where H represents an upper triangular matrix with diagonal elements being 1, and $\Sigma$ represents a diagonal matrix with real elements. In this case, a ZF data estimate formula develops as follows:

$$\hat{d}_{n,ZF-BLE} = (\Sigma H)^{-1} \cdot (H^{*T} \Sigma)^{-1} \cdot A_n^{*T} R_n^{-1} e_n$$

Figure 13:
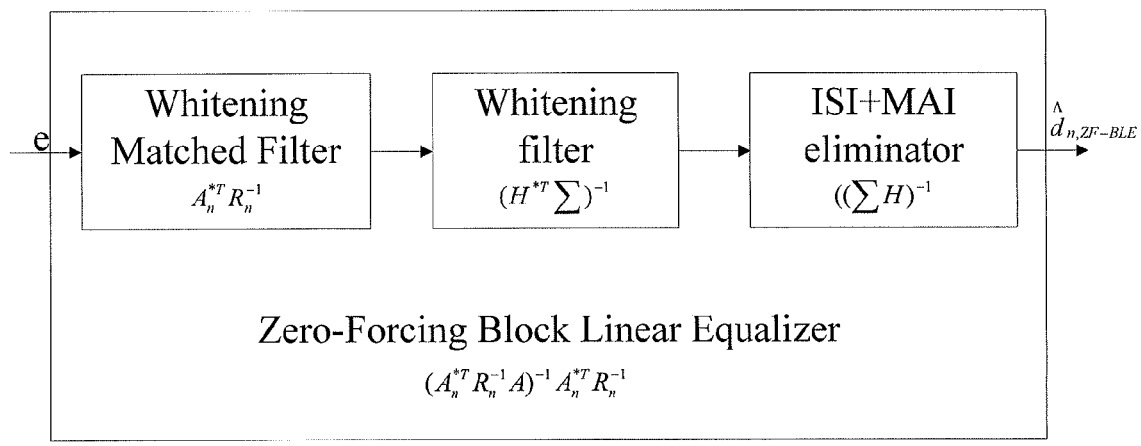
FIG. 13 is a schematic diagram showing the structure of a Zero-Forcing Block Linear Equalizer according to the first embodiment of the invention.

That is, ZF-BLE can be regarded as an expansion of WMF and has a structure as shown in FIG. 13.

3. The Minimum Mean Square Error Block Linear Equalizer Method

Figure 14:
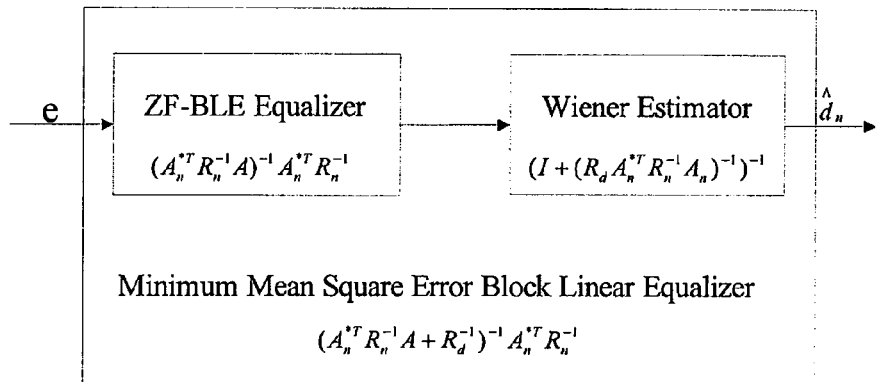
FIG. 14 is a schematic diagram showing the structure of a Minimum Mean Square Error Block Linear Equalizer according to the first embodiment of the invention.

In the present Minimum Mean Square Error Block Linear Equalizer method, a continuous estimate value of $d_n$ is obtained through $E(\|\hat{d}_{n,MMSE-BLE} - d_n\|^2) \to 0$ or positive define $Q(\hat{d}_{n,MMSE-BLE}) = E\{(\hat{d}_{n,MMSE-BLE} - d_n)^{*T}(\hat{d}_{n,MMSE-BLE} - d_n)\} \to 0$ as follows:

$$\hat{d}_{n,MMSE-BLE} = (A_n^{*T} R_n^{-1} A_n + R_d^{-1})^{-1} A_n^{*T} R_n^{-1} e_n$$

$$= (I + (R_d A_n^{*T} R_n^{-1} A_n)^{-1})^{-1} \cdot (A_n^{*T} R_n^{-1} A_n)^{-1} A_n^{*T} R_n^{-1} e_n$$

$$= W_0 \cdot (A_n^{*T} R_n^{-1} A_n)^{-1} A_n^{*T} R_n^{-1} e_n,$$

where, $R_d$ denotes a covariance matrix of data symbol vectors, i.e. $R_d = E\{d_n \cdot d_n^{*T}\}$, which is a square matrix of KN*KN, I denotes a unit matrix of KN*KN, and $W_0$ denotes a Wiener Estimator, which is the optimal linear filter and greatly alleviates the background noise while optimally estimating the transmitted data symbols. FIG. 14 is a block diagram showing the structure of MMSE-BLE.

When conditions of $R_d = I$ and $R_n = \sigma^2 I$ are satisfied, the estimate value of the MMSE-BLE algorithm is $\hat{d}_{n,MMSE-BLE} = (A_n^{*T} + \sigma^2 I)^{-1} A_n^{*T} e_n$.

The above linear algorithms can be further extended to form the so-called Decision Feedback (DF) algorithms such as WMF-BDEF, ZF-BDFE and MMSE-BDFE. In the DF algorithm, a linear equalizer is arranged for continuous value estimate on user symbols, and after the quantization (decision) of the estimated values, a result of the quantization is fed back to the continuous value estimate according to a certain feedback criteria, so that a closed loop is formed. The nonlinear algorithm in the joint detection algorithm exactly refers to the DF algorithm. The nonlinear algorithm is introduced by feeding previous data symbol estimate values back to the detector.

If the error rate is low, the nonlinear DF joint detection has a better performance than the joint detection based on the linear algorithm, but is difficult to implement due to its complexity.

Particular implementation of the embodiment of the invention is described in detail by way of example of a method based on the linear transform.

A soft output value from transmission data $d_n$ estimate can be represented as follows:

$$\hat{d}_n = (T_n)^{-1} A_n^{*T} e_n$$

$$T_n = \begin{cases} I & WMF \\ A_n^{*T} A_n & ZF-BLE \\ A_n^{*T} A_n + \sigma^2 I & MMSE-BLE \end{cases}$$

If data sequences are independent from each other, $R_d = I$; and if the noise sequence n is AWGN, $R_n = \sigma^2 I$, and the formula above can be simplified as follows:

$$\hat{d}_n = (T_n)^{-1} A_n^{*T} e_n$$

$$T_n = \begin{cases} I & WMF \\ A_n^{*T} A_n & ZF-BLE \\ A_n^{*T} A_n + \sigma^2 I & MMSE-BLE \end{cases}$$

$$A_n = \begin{bmatrix} a_n^{(0,0)} & a_n^{(0,1)} & \cdots & a_n^{(0,K_u-1)} \\ a_n^{(1,0)} & a_n^{(1,1)} & \cdots & a_n^{(1,K_u-1)} \\ \vdots & \vdots & \vdots & \vdots \\ a_n^{(RF-1,0)} & a_n^{(RF-1,1)} & \cdots & a_n^{(RF-1,K_u-1)} \end{bmatrix}$$

$$= \begin{bmatrix} C_0^{(0)} \cdot h_n^{(0,0)} & C_0^{(1)} \cdot h_n^{(0,1)} & \cdots & C_0^{(K_u-1)} \cdot h_n^{(0,K_u-1)} \\ C_1^{(0)} \cdot h_n^{(1,0)} & C_1^{(1)} \cdot h_n^{(1,1)} & \cdots & C_1^{(K_u-1)} \cdot h_n^{(1,K_u-1)} \\ \vdots & \vdots & \vdots & \vdots \\ C_{RF-1}^{(0)} \cdot h_n^{(RF-1,0)} & C_{RF-1}^{(1)} \cdot h_n^{(RF-1,1)} & \cdots & C_{RF-1}^{(K_u-1)} \cdot h_n^{(RF-1,K_u-1)} \end{bmatrix}$$

As shown, the system matrix $A_n$ and matrix $T_n$ are required to be resolved for the joint detection. The system matrix $A_n$ is a matrix of RF×Ku, and can be resolved from the convolution of an RC sequence which is a combination of weight factors for multiple repeated BUs corresponding to the same data symbol of a user and a channel response sequence which is a combination of channel responses corresponding to the RC sequence (If a scrambling code is applied, a scrambling code sequence including scrambling codes of the user within the repeated BUs is required to be multiplied). The matrix $T_n$ is a matrix of Ku×Ku and is of a relatively low order, and shall be calculated for the three linear detection algorithms of WMF, ZF-BLE and MMSE-BLE.

In the embodiment, considering the little impact of a difference between combined repeated channel response sequence arrays $A_n$ on the result of joint detection, the method of the joint detection of the BR signals can be simplified as follows.

The array $A_n$ of each data symbol of a user can be substituted by a common parameter $A_\alpha$, which may be either a certain $A_n$ or other matrix, so that the process of obtained the combined repeated channel response sequence array is significantly simplified. That is, in the channel estimate of BUs, channel estimate on each time and frequency grid point by interpolation is not necessary, instead, a uniform channel estimate on all time and frequency grid points within a certain granularity can be deployed, a larger granularity corresponds to a simpler channel estimate, and a small granularity corresponds to a relatively complex channel estimate. For example, if a uniform channel response is used for the time and frequency grid points corresponding to all data symbols of an entire repeated BU to construct the combined repeated channel response sequence array, an average value of channel estimate responses on pilot symbols within the BU is sufficient.

Figure 15:
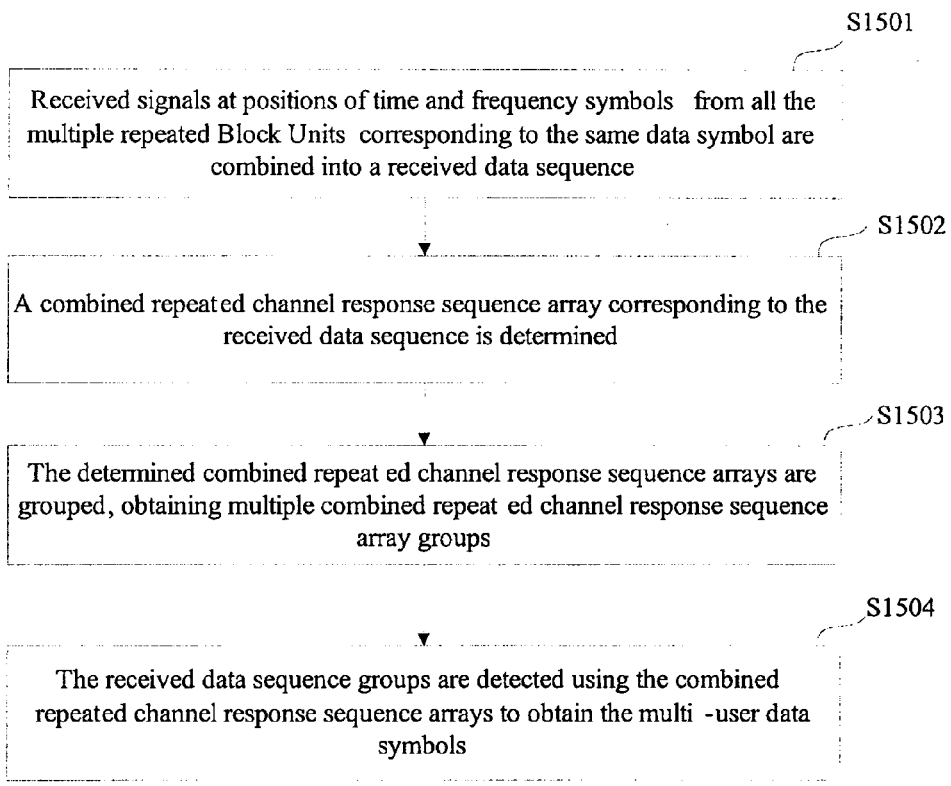
FIG. 15 is a flow chart of a method for multi-user detecting of an OFDM transmission signal according to a second embodiment of the invention.

The method for multi-user detecting of an OFDM transmission signal according to a second embodiment of the invention is based on the method for multi-user detecting of an OFDM transmission signal according to the first embodiment of the invention, and includes: a received data sequence generating process, a combined repeated channel response sequence array generating process, a combined repeated channel response sequence array grouping process, and a received data sequence detecting process. The method for multi-user detecting of an OFDM transmission signal according to the second embodiment of the invention is described with reference to FIG. 15 as follows.

Process S1501: Received signals at positions of time and frequency symbols from all the multiple repeated Block Units corresponding to the same data symbol are combined into a received data sequence.

This process is similar with process S801 in the first embodiment and thus is not described in detail herein.

Process S1502: A combined repeated channel response sequence array corresponding to the received data sequence is determined.

This process is similar with process S802 in the first embodiment and thus is not described in detail herein.

Process S1503: The determined combined repeated channel response sequence arrays are grouped, obtaining multiple combined repeated channel response sequence array groups.

In a first grouping method in the present embodiment, the determined combined repeated channel response sequence arrays are grouped according to correlation between combined repeated channel response sequences of multiple users. Firstly, according to the combined repeated channel response sequence array of each user obtained from the channel estimate on the user dedicated pilot symbols inserted to the repeated BUs, the correlation between the combined repeated channel response sequence arrays in the multi-user signal is estimated, and then the combined repeated channel response sequence arrays of all the users are grouped according to the strength of the correlation. For example, given a correlation threshold, it is possible to define the correlation between the combined repeated channel response sequence arrays larger than the correlation threshold as strong, and define the correlation between the combined repeated channel response sequence arrays lower than the correlation threshold as weak, in this case, the combined repeated channel response sequence arrays with strong correlation are gathered into a group, while the combined repeated channel response sequence arrays with weak correlation are gathered into another group. The correlation of multiple combined repeated channel response sequence arrays may be the average correlation, the largest correlation or the least correlation.

In a second grouping method in the present embodiment, the determined combined repeated channel response sequence arrays are grouped according to receiving intensity of the pilot symbol signals of multiple users. Firstly, according to the receiving intensity of each user dedicated pilot symbol signal obtained from the channel estimate on the user dedicated pilot symbols inserted to the repeated BUs, an amplitude or power (which is the square of the amplitude) of the pilot symbol signal of each user is estimated, and then the combined repeated channel response sequence arrays of all the users are grouped according to the magnitude of the amplitude or power of the pilot symbol signal of each user. For example, given a threshold of the amplitude or power of the pilot symbol signal, it is possible to define a pilot symbol signal with an amplitude or power larger than the threshold as strong, and define a pilot symbol signal with an amplitude or power lower than the threshold as weak, in this case, pilot symbol signals each with strong amplitudes or powers are gathered into a group, while pilot symbol signals each with weak amplitudes or powers are gathered into another group.

The present embodiment is not limited to the above two grouping methods, for example, it is also possible to group simply according to cells of the users, which is equivalent to grouping according to scrambling code sequences since different scrambling codes may be allocated to the cells for distinguishing. It will be appreciated to those skilled in the art to group the determined combined repeated channel response sequence arrays by combining the above methods, or any other principle.

Process S1504: The received data sequence groups are detected using the combined repeated channel response sequence arrays to obtain the multi-user data symbols. This process includes:

detecting the received data sequences using the obtained multiple combined repeated channel response sequence array groups respectively, to obtain multiple group detection results;

restoring interference based on the multiple group detection results, to obtain interference components caused by the respective combined repeated channel response sequence array groups;

obtaining a net receiving data sequence of a user in a group by canceling the interference of an interference component of a user not belonging to the group with the received data sequence; and detecting the groups of the net receiving data sequences using the respective combined repeated channel response sequence array groups, to obtain the multi-user data symbols.

As described in the first embodiment of the invention, the joint detection method may be a nonlinear multi-user detection method such as Interference Cancellation detection, or a linear multi-user detection method such as Minimum Mean Square Error Block Linear Equalizer method, or a combination of the above. In the embodiment, the above method can also be used for the detecting of the received data sequence using the obtained multiple combined repeated channel response sequence array groups, for example, the linear multi-user detection method such as Minimum Mean Square Error Block Linear Equalizer method is used within the combined repeated channel response sequence array group, while the nonlinear multi-user detection method such as Interference Cancellation detection is used between different combined repeated channel response sequence array groups.

The implementation of the invention is described below by way of example of three groups.

Process 1): For each group, the received data sequence $e_n$ is detected using a Block Linear Equalizer joint detection method within the group, that is, each group is detected using a linear joint detection algorithm according to a formula below:

$$e_n = A_0 d_0 + A_1 d_1 + A_2 d_2 + n$$

where, $A_0$, $A_1$ and $A_2$ correspond to combined repeated channel response sequence arrays of the three groups, respectively; $d_0$, $d_1$ and $d_2$ respectively correspond to an addition of transmission data sequences of multiple users in each of the three groups; and n denotes noise.

In the case of single-cell joint detection of a group 1, it is regarded that $e_n = A_0 d_0 + (A_1 d_1 + A_2 d_2 + n) = A_0 d_0 + n_1$, where $n_1$ denotes interference of a signal not belonging to interfering group 1, and $d_0$ can be resolved using the linear joint detection method. Also, $d_1$ and $d_2$ can be resolved similarly.

Process 2): The detected results for the respective groups are used for interference restoring, obtaining respectively interference $A_1 d_1$ and $A_2 d_2$ of interfering groups 2 and 3 with the interfering group 1.

Process 3): The interference $A_1 d_1$ and $A_2 d_2$ not belonging to the group is cancelled in the total receiving data sequence $e_n$, to obtain a net signal of the group, i.e. $A_0 d_0 + n = e_n - (A_1 d_1 + A_2 d_2)$.

Process 4): The net signal of the group including the user to be detected is subjected to the Block Linear Equalizer joint detection to obtain a result of the transmission signal $d_0$ of the user. Comparing with $d_0$ obtained directly using the linear joint detection method in process 1), the $d_0$ obtained in the present process is more accurate because the interference by other groups is eliminated. Similarly, $d_1$ and $d_2$ can be resolved as desired to obtain all user data symbols involved in the multi-user detection.

The interference canceling process is performed once in the embodiment above. However, the interference canceling process can be performed more than once. For one or more times of interference canceling in the implementation, it is possible to set an iterative number and conduct the processes of "Block Linear Equalizer+interference canceling" as follows. The iterative number refers to the times of interference canceling.

Operation 1): Each group is subjected single-user joint detection using the Block Linear Equalizer method to obtain a detected result of the group, it is determined whether the iterative number is reached, and if the iterative number is reached, the detected result of the group including the user to be detected is output, otherwise, Operation 2) is conducted.

Operation 2): An interference component due to a signal response of each group is restored according to the detected result of the group.

Operation 3): Interference components from other groups are canceled in the received signal of a group to obtain a net signal of the group.

Operation 4): The net signal is used as a group result for the next operation, and Operation 1) is carried out again.

Figure 16:
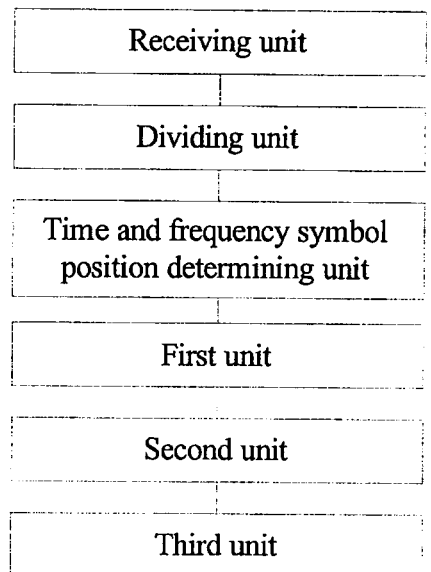
FIG. 16 is a schematic diagram of a device for multi-user detecting of an OFDM transmission signal according to a third embodiment of the invention.

As shown in FIG. 16, a device for multi-user detecting of an OFDM transmission signal according to a third embodiment of the invention includes: a first unit, a second unit and a third unit. The device for multi-user detection in the embodiment may further include: a receiving unit, a dividing unit and a time and frequency symbol position determining unit.

The receiving unit is configured to receive broadband Orthogonal Frequency Division Multiplexing data symbols. The operations of the receiving unit are similar with those described in the first embodiment and will not be described herein.

The dividing unit is configured to, according to predefined repeated BUs, divide and allocate effective data in the OFDM data symbols received by the receiving unit to multiple repeated BUs. The operations of the dividing unit are similar with those described in the first embodiment and will not be described herein.

The time and frequency symbol position determining unit is configured to use an interleaver to interleave and sort the data symbols in the repeated BUs generated by the dividing unit, determine the positions of time and frequency symbols corresponding to the same data symbol within the respective repeated BUs according to the data sequence obtained from the interleaving and sorting. The operations of the time and frequency symbol position determining unit are similar with those described in the first embodiment and will not be described herein.

The first unit is configured to, according to the positions of time and frequency symbols determined by the time and frequency symbol position determining unit, combine the received signals at positions of time and frequency symbols from all the multiple repeated Block Units corresponding to the same data symbol into the received data sequence. The operations of the first unit are similar with those described in the first embodiment and will not be described herein.

The second unit is configured to determine a combined repeated channel response sequence array corresponding to the received data sequence. The second unit may further include a first combined repeated channel response sequence array generating module. Alternatively, the second unit may further include a second combined repeated channel response sequence array generating module.

The first combined repeated channel response sequence array generating module is configured to obtain the combined repeated channel response sequence of each user from an RC sequence, which is a combination of weight factors used for weighting multiple repeated BUs according to the same data symbol of the user, and a repeated channel response sequence, which is a combination of channel responses of the repeated BUs of the user; and to construct the combined repeated channel response sequence array corresponding to the received data sequence using a combination of repeated channel response sequences of multiple users. The operations of the first combined repeated channel response sequence array generating module are similar with those described in the first embodiment and will not be described herein.

The second combined repeated channel response sequence array generating module is configured to obtain the combined repeated channel response sequence of each user from an RC sequence which is a combination of weight factors used for weighting multiple repeated BUs according to the same data symbol of the user, a repeated channel response sequence which is a combination of channel responses of the repeated BUs of the user, and a scrambling code sequence which is a combination of scrambling codes in the repeated BUs for the user; and to construct the combined repeated channel response sequence array corresponding to the received data sequence using a combination of repeated channel response sequences of multiple users. The operations of the second combined repeated channel response sequence array generating module are similar with those described in the first embodiment and will not be described herein.

The third unit is configured to detect the received data sequence determined by the first unit using the combined repeated channel response sequence array determined by the second unit, to obtain the multi-user data symbols.

The third unit may further include a matched filter module and a Block Linear Equalizer module.

The matched filter module is configured for matched filtering of the received data sequence using the combined repeated channel response sequence array. The operations of the matched filter module are similar with those described in the first embodiment and will not be described herein.

The Block Linear Equalizer module is configured to process a result obtained from the matched filtering using a Block Linear Equalizer method, to obtain the multi-user data symbols. The operations of the Block Linear Equalizer module are similar with those described in the first embodiment and will not be described herein.

Figure 17:
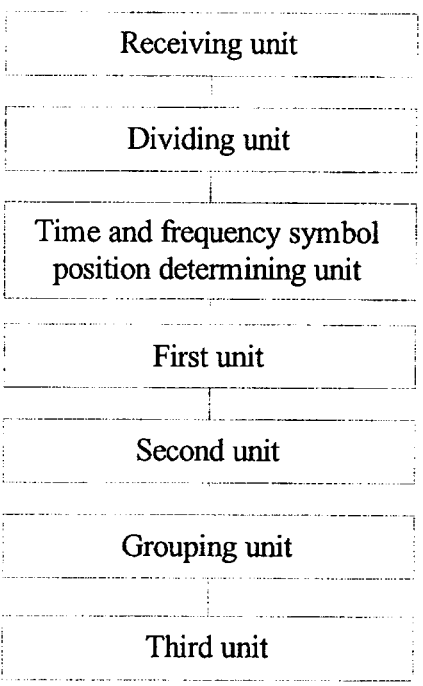
FIG. 17 is a schematic diagram of a device for multi-user detecting of an OFDM transmission signal according to a fourth embodiment of the invention.

As shown in FIG. 17, a device for multi-user detecting of an OFDM transmission signal according to a fourth embodiment of the invention includes: a first unit, a second unit, a grouping unit and a third unit. The device for multi-user detection in the embodiment may further include: a receiving unit, a dividing unit and a time and frequency symbol position determining unit.

The receiving unit is configured to receive broadband Orthogonal Frequency Division Multiplexing data symbols. The operations of the receiving unit are similar with those described in the first embodiment and will not be described herein.

The dividing unit is configured to, according to predefined repeated BUs, divide and allocate effective data in the OFDM data symbols received by the receiving unit to multiple repeated BUs. The operations of the dividing unit are similar with those described in the first embodiment and will not be described herein.

The time and frequency symbol position determining unit is configured to use an interleaver to interleave and sort the data symbols in the repeated BUs generated by the dividing unit, the positions of time and frequency symbols corresponding to the same data symbol within the respective repeated BUs are determined according to the data sequence obtained from the interleaving and sorting. The operations of the time and frequency symbol position determining unit are similar with those described in the first embodiment and will not be described herein.

The first unit is configured to, according to the positions of time and frequency symbols determined by the time and frequency symbol position determining unit, combine the received signals at positions of time and frequency symbols from all the multiple repeated Block Units corresponding to the same data symbol into the received data sequence. The operations of the first unit are similar with those described in the first embodiment and will not be described herein.

The second unit is configured to determine a combined repeated channel response sequence array corresponding to the received data sequence determined by the first unit. The second unit may further include a first combined repeated channel response sequence array generating module or a second combined repeated channel response sequence array generating module.

The first combined repeated channel response sequence array generating module is configured to obtain the combined repeated channel response sequence of each user from an RC sequence, which is a combination of weight factors used for weighting multiple repeated BUs according to the same data symbol of the user, and a repeated channel response sequence, which is a combination of channel responses of the repeated BUs of the user; and to construct the combined repeated channel response sequence array corresponding to the received data sequence using a combination of repeated channel response sequences of multiple users. The operations of the first combined repeated channel response sequence array generating module are similar with those described in the first embodiment and will not be described herein.

The second combined repeated channel response sequence array generating module is configured to obtain the combined repeated channel response sequence of each user from an RC sequence which is a combination of weight factors used for weighting multiple repeated BUs according to the same data symbol of the user, a repeated channel response sequence which is a combination of channel responses of the repeated BUs of the user, and a scrambling code sequence which is a combination of scrambling codes in the repeated BUs for the user; and to construct the combined repeated channel response sequence array corresponding to the received data sequence using a combination of repeated channel response sequences of multiple users. The operations of the second combined repeated channel response sequence array generating module are similar with those described in the first embodiment and will not be described herein.

The grouping unit is configured to group the combined repeated channel response sequence arrays determined by the second unit, to obtain multiple combined repeated channel response sequence array groups. The operations of the grouping unit are similar with those described in the second embodiment and will not be described herein.

The third unit is configured to detect the received data sequence using the combined repeated channel response sequence array groups determined by the grouping unit, to obtain the multi-user data symbols. The third unit may further include a first detecting module, an interference canceling module and a second detecting module.

The first detecting module is configured to detect the received data sequences using the obtained multiple combined repeated channel response sequence array groups respectively to obtain multiple group detection results, and restore interference based on the multiple group detection results to obtain interference components caused by the respective combined repeated channel response sequence array groups. The operations of the first detecting module are similar with those described in the second embodiment and will not be described herein.

The interference canceling module is configured to obtain a net receiving data sequence of a user in a group by canceling the interference of an interference component of a user not belonging to the group with the received data sequence. The operations of the interference canceling module are similar with those described in the second embodiment and will not be described herein.

The second detecting module is configured to detect the groups of the net receiving data sequences using the respective combined repeated channel response sequence array groups, to obtain the multi-user data symbols. The operations of the second detecting module are similar with those described in the second embodiment and will not be described herein.

As described above, in the method and device for multi-user detecting of the OFDM transmission signal according to the embodiments of the invention, the received data sequence is detected using multi-user combined repeated channel response sequence array. Compared with a single-user detection method, system performance in the embodiments of the invention is improved significantly, because other multi-user data symbols that are superposed through BR modulation are processed as useful information, the effect between the users that is caused by the BR extension and the passage of the extended chips (i.e. symbols within the various repeated BUs that are mapped to the same data symbol) through different channels can be eliminated effectively, and the effect of non-orthogonality between the BR extended codes can be suppressed. For example, the signal receiving quality is improved, the frequency spectrum utilization is improved, a system capacity is improved, the near-far effect is overcome, transmission power is lowered, performance at the edge of a cell is improved, and so on. The method according to the second embodiment of the invention can ensure a lower cost and improved performance while suppressing the Multiple Access Interference in the OFDM transmission signals and improving system performance. With the multi-user detection solutions in the invention, the Multiple Access Interference due to non-orthogonal extension of user signals in the OFDM signal transmission based on the BR extension can be suppressed effectively, and the performance at the edge of a cell in the OFDM cellular network system ban be improved significantly.

It will be appreciated to those skilled in the art that various modifications and alterations may be made to the present invention without departing from the scope of the invention. Thus, the invention is intended to comprise all these modifications and alterations if they fall into the scope of the invention defined by the appended claims and equivalents.

The invention claimed is:

1. A method for multi-user detecting of an Orthogonal Frequency Division Multiplexing (OFDM) transmission signal, comprising:
    combining received signals, at corresponding time-frequency symbol positions in all of multiple repeated Block Units in relation to a same data symbol of respective users in the multiple repeated Block Units, into a received data sequence;
    determining a combined repeated channel response sequence array corresponding to the received data sequence; and
    detecting the received data sequence using the combined repeated channel response sequence array to obtain data symbols of the respective users; and
    wherein determining the combined repeated channel response sequence array corresponding to the received data sequence comprises:
    obtaining combined repeated channel response sequences for the respective users from a Repeat Code sequence consisting of weight factors used for weighting the same data symbol of the respective users in the multiple repeated Block Units, and a repeated channel response sequence which is a combination of channel responses for the respective users in the multiple repeated Block Units; and obtaining the combined repeated channel response sequence array corresponding to the received data sequence from a combination of the combined repeated channel response sequences for the respective users; or
    obtaining combined repeated channel response sequences for the respective users from a Repeat Code sequence consisting of weight factors used for weighting the same data symbol of the respective users in the multiple repeated Block Units, a repeated channel response sequence which is a combination of channel responses for the respective users in the multiple repeated Block Units, and a scrambling code sequence which is a combination of scrambling codes for the respective users in the multiple repeated Block Units; and obtaining the combined repeated channel response sequence array corresponding to the received data sequence from a combination of the combined repeated channel response sequences for the respective users.

2. The method of claim 1, further comprising, before combining the received signals, at the corresponding time-frequency symbol positions in all of the multiple repeated Block Units in relation to the same data symbol, into the received data sequence:
    receiving broadband OFDM data symbols according to predefined repeated Block Units, dividing and allocating effective data symbols in the received OFDM data symbols to multiple repeated Block Units.

3. The method of claim 2, further comprising, after dividing and allocating the effective data symbols in the received OFDM data symbols to the multiple repeated Block Units:
    interleaving and sequencing the data symbols in the multiple repeated Block Units by an interleaver, the corresponding time-frequency symbol positions in the multiple repeated Block Units in relation to the same data symbol are determined according to a data symbol sequence obtained from the interleaving and sequencing,
    wherein an independent interleaver is used for each of the multiple repeated Block Units to perform the interleaving and sequencing of the data symbols in the repeated Block Unit.

4. The method of claim 1, wherein the same scrambling code sequence is used for users in the same cell.

5. The method of claim 1, further comprising:
    performing channel estimation on a user dedicated pilot symbol inserted in a repeated Block Unit to obtain a channel response for a user of the respective users in the repeated Block Unit;

wherein performing channel estimation on the user dedicated pilot symbol inserted in the repeated Block Unit to obtain the channel response for the user in the repeated Block Unit comprises:
  performing channel estimation on the user dedicated pilot symbol inserted in the repeated Block Unit to obtain a channel response of the pilot symbol, and
  performing interpolation processing on the channel response of the pilot symbol to obtain the channel response, of a received signal at a time-frequency symbol position, for the user in the repeated Block Unit.

6. The method of claim 1, wherein detecting the received data sequence using the combined repeated channel response sequence array to obtain the data symbols of the respective users comprises:
  matched filtering the received data sequence using the combined repeated channel response sequence array; and
  processing a result obtained from the matched filtering with a Linear Joint Detector, to obtain the data symbols of the respective users.

7. The method of claim 6, wherein the Linear Joint Detector comprises one of a Whitening Matched Filter, a Zero-Forcing Block Linear Equalizer, or a Minimum Mean Square Error Block Linear Equalizer.

8. The method of claim 6, further comprising noise decorrelation processing on the received data sequence before the matched filtering.

9. The method of claim 1, further comprising: dividing the determined combined repeated channel response sequence array into multiple combined repeated channel response sequence array groups;
  wherein detecting the received data sequence using the combined repeated channel response sequence array to obtain the data symbols of the respective users comprises:
  detecting the received data sequence using respective multiple combined repeated channel response sequence array groups, to obtain multiple group detection results; restoring interference based on the multiple group detection results, to obtain interference components caused by the respective multiple combined repeated channel response sequence array groups;
  obtaining a respective net receiving data sequence of a user of the respective users, the user belonging to a group, the respective net receiving data sequence corresponding to a respective multiple combined repeated channel response array group by cancelling interference caused by an interference component of a user not belonging to the group; and
  detecting respective net receiving data sequences of the respective users using the respective combined repeated channel response sequence array groups, to obtain the data symbols of the respective users.

10. The method of claim 9, wherein dividing the determined combined repeated channel response sequence array comprises:
  dividing the determined combined repeated channel response sequence array according to at least one of correlation between combined repeated channel response sequences of the respective users, cells of the respective users and signal receiving intensities of pilot symbols of the respective users.

11. The method of claim 1, wherein the respective users are:
  multiple users in the same cell; or
  multiple users in different cells.

12. The method of claim 11, further comprising determining the respective users according to a selection of intensities of received signals of the respective users.

13. The method of claim 12, wherein the intensities of the received signals comprise intensities of received signals for user dedicated pilot sequence signals.

14. A device for multi-user detecting of an Orthogonal Frequency Division Multiplexing (OFDM) transmission signal, comprising:
  a first unit, which is configured to combine received signals, at corresponding time-frequency symbol positions in all of multiple repeated Block Units in relation to a same data symbol of respective users in the multiple repeated Block Units, into a received data sequence;
  a second unit, which is configured to determine a combined repeated channel response sequence array corresponding to the received data sequence; and
  a third unit, which is configured to detect the received data sequence using the combined repeated channel response sequence array, to obtain data symbols of the respective users; and
  wherein the second unit comprises:
  a first combined repeated channel response sequence array generating module, which is configured to obtain combined repeated channel response sequences for the respective users from an Repeat Code sequence consisting of weight factors used for weighting the same data symbol of the respective users in the multiple repeated Block Units, and a repeated channel response sequence which is a combination of channel responses for the respective users in the multiple repeated Block Units; and to construct the combined repeated channel response sequence array corresponding to the received data sequence using a combination of the combined repeated channel response sequences for the respective users; or
  a second combined repeated channel response sequence array generating module, which is configured to obtain combined repeated channel response sequences for the respective users from an Repeat Code sequence consisting of weight factors used for weighting the same data symbol of the respective users in the multiple repeated Block Units, a repeated channel response sequence which is a combination of channel responses for the respective users in the multiple repeated Block Units, and a scrambling code sequence which is a combination of scrambling codes for the respective users in the multiple repeated Block Units; and to construct the combined repeated channel response sequence array corresponding to the received data sequence using a combination of the combined repeated channel response sequences for the respective users.

15. The device of claim 14, further comprising:
  a receiving unit, which is configured to receive broadband Orthogonal Frequency Division Multiplexing data symbols; and
  a dividing unit, which is configured to, according to predefined repeated Block Units, divide and allocate effective data symbols in the received OFDM data symbols to multiple repeated Block Units.

16. The device of claim 15, further comprising;
  a time-frequency symbol position determining unit, which is configured to use an interleaver for interleaving and sequencing the data symbols in the multiple repeated Block Units, determine the time-frequency symbol positions in the multiple repeated Block Units (BUs) in relation to the same data symbol according to a data symbol sequence obtained from the interleaving and sequencing.

17. The device of claim 14, wherein the third unit comprises:
- a matched filter module, which is configured to perform matched filtering of the received data sequence using the combined repeated channel response sequence array; and
- a Linear Joint Detection module, which is configured to process a result obtained from the matched filtering, to obtain the data symbols of the multiple users.

18. The device of claim 14, further comprising a dividing unit configured to divide the determined combined repeated channel response sequence array into multiple combined repeated channel response sequence array groups;
wherein the third unit further comprises:
- a first detecting module, which is configured to detect the received data sequence using respective multiple combined repeated channel response sequence array groups to obtain multiple group detection results, and restore interference based on the multiple group detection results to obtain interference components caused by the respective multiple combined repeated channel response sequence array groups;
- an interference canceling module, which is configured to obtain a respective net receiving data sequence of a user of the respective users, the user belonging to a group, the respective net receiving data sequence corresponding to a respective multiple combined repeated channel response array group by cancelling interference caused by an interference component of a user not belonging to the group; and
- a second detecting module, which is configured to detect respective net receiving data sequences of the respective users using the respective combined repeated channel response sequence array groups, to obtain the data symbols of the respective users.

* * * * *